(12) United States Patent
Gross et al.

(10) Patent No.: US 9,810,768 B2
(45) Date of Patent: Nov. 7, 2017

(54) ANGLE-RESOLVING RADAR SENSOR

(75) Inventors: Volker Gross, Ditzingen (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 682 days.

(21) Appl. No.: 14/351,522

(22) PCT Filed: Aug. 27, 2012

(86) PCT No.: PCT/EP2012/066585
§ 371 (c)(1),
(2), (4) Date: Jul. 23, 2014

(87) PCT Pub. No.: WO2013/056880
PCT Pub. Date: Apr. 25, 2013

(65) Prior Publication Data
US 2014/0354467 A1    Dec. 4, 2014

(30) Foreign Application Priority Data
Oct. 17, 2011  (DE) .................. 10 2011 084 610

(51) Int. Cl.
*G01S 3/16* (2006.01)
*G01S 13/34* (2006.01)
(Continued)

(52) U.S. Cl.
CPC ...... *G01S 7/02* (2013.01); *G01S 3/16* (2013.01); *G01S 3/22* (2013.01); *G01S 13/02* (2013.01);
(Continued)

(58) Field of Classification Search
CPC ...... G01S 3/16; G01S 3/22; G01S 3/28; G01S 3/32; G01S 3/74; G01S 7/02; G01S 7/35;
(Continued)

(56) References Cited

U.S. PATENT DOCUMENTS 3,825,928 A * 7/1974 Williams .................. G01S 7/12
                                                    342/157
3,842,417 A * 10/1974 Williams .................. G01S 7/12
                                                    342/158

(Continued)

FOREIGN PATENT DOCUMENTS

DE          3889118 T2        7/1994
DE          100 27 345         2/2001
(Continued)

OTHER PUBLICATIONS

International Search Report for PCT/EP2012/066585, dated Oct. 18, 2012.

*Primary Examiner* — Peter Bythrow
(74) *Attorney, Agent, or Firm* — Norton Rose Fulbright US LLP; Gerard Messina

(57) ABSTRACT

An angle-resolving radar sensor, e.g., for motor vehicles, includes; an antenna having multiple antenna elements which are each switchable to one of multiple evaluation channels; and an evaluation device for determining the angle of incidence of a received signal based on the amplitudes measured in the evaluation channels. The number of antenna elements is greater than the number of evaluation channels and a switching device is provided to connect the evaluation channels alternatingly to different selections of antenna elements.

4 Claims, 2 Drawing Sheets

(51) Int. Cl.
*G01S 7/02* (2006.01)
*G01S 3/22* (2006.01)
*H01Q 3/24* (2006.01)
*H01Q 1/32* (2006.01)
*H01Q 25/00* (2006.01)
*G01S 13/02* (2006.01)

(52) U.S. Cl.
CPC ........... *G01S 13/34* (2013.01); *H01Q 1/3233* (2013.01); *H01Q 3/24* (2013.01); *H01Q 25/002* (2013.01); *G01S 13/343* (2013.01)

(58) Field of Classification Search
CPC ............. G01S 2013/0236; G01S 13/34; G01S 13/343; G01S 13/44; G01S 13/4409; H01Q 3/24; H01Q 25/002
USPC .................................................. 342/147–158
See application file for complete search history.

(56) References Cited

U.S. PATENT DOCUMENTS

| | | | | |
|---|---|---|---|---|
| 4,924,235 A * | 5/1990 | Fujisaka | ................ | G01S 13/42 342/158 |
| 4,963,890 A * | 10/1990 | Perrotta | ................... | G01S 3/42 342/155 |
| 5,940,029 A * | 8/1999 | Ninomiya | ........... | G01S 13/4409 342/154 |
| 6,288,672 B1 * | 9/2001 | Asano | ..................... | G01S 7/35 342/368 |
| 6,337,656 B1 * | 1/2002 | Natsume | ................. | G01S 13/44 342/149 |
| 7,486,230 B2 * | 2/2009 | Takano | ................... | G01S 13/42 342/147 |
| 7,612,706 B2 * | 11/2009 | Honda | ................... | H01Q 25/02 342/107 |
| 9,310,478 B2 * | 4/2016 | Gross | .................... | G01S 13/931 |
| 2002/0126045 A1 * | 9/2002 | Kishigami | ........... | G06K 9/0057 342/417 |
| 2004/0183719 A1 * | 9/2004 | Natsume | ................. | H01Q 3/24 342/147 |
| 2005/0156780 A1 * | 7/2005 | Bonthron | ............. | G01S 13/343 342/107 |
| 2007/0075889 A1 * | 4/2007 | Sheen | .................... | G01S 13/89 342/22 |
| 2008/0291088 A1 * | 11/2008 | Nagai | .................... | G01S 13/34 342/374 |
| 2010/0066635 A1 * | 3/2010 | Lindgren | ................ | H01Q 1/523 343/893 |

FOREIGN PATENT DOCUMENTS

| | | |
|---|---|---|
| DE | 10 2009 029 503 | 3/2011 |
| EP | 0 371 133 | 6/1990 |
| EP | 1 788 408 | 5/2007 |
| JP | 2007-147554 A | 6/2007 |
| KR | 100 979 284 | 8/2010 |
| WO | WO 2008/066436 | 6/2008 |

\* cited by examiner

ANGLE-RESOLVING RADAR SENSOR

BACKGROUND OF THE INVENTION

1. Field of the Invention

The present invention relates to an angle-resolving radar sensor, in particular for motor vehicles, including an antenna having multiple antenna elements which are each switchable to one of multiple evaluation channels and including an evaluation device for determining the angle of incidence of a received signal based on the amplitudes measured in the evaluation channels.

2. Description of the Related Art

Radar sensors are used in motor vehicles, for example, to measure distances, relative velocities, and azimuths of vehicles or other objects located ahead of one's own vehicle. Radar sensors including a group antenna having a planar design have the advantage in these applications that they only require little installation space. Individual antenna elements of the group antenna are situated at a distance from one another horizontally, so that different azimuths of the located objects result in different running times the radar signals need to travel from the object to the particular antenna element. These running time differences result in corresponding differences in the phase of the signals which are received by the antenna elements and evaluated in the associated evaluation channels. By comparing the (complex) amplitudes received in the different channels to the corresponding amplitudes in an antenna diagram, the angle of incidence of the radar signal and thus the azimuth of the located object may then be determined.

To achieve a high angular resolution, the aperture of the antenna should be as large as possible. (In the case of a planar group antenna, the aperture represents the overall extension of the group antenna in the direction of the angle measurement with regard (horizontally) to wavelength $\lambda$ of the radar radiation). If, however, the distances between the adjacent antenna elements are too great, ambiguities in the angle measurement may occur, since the same phase relations between the received signals are obtained for running time differences which differ by integral multiples of wavelength $\lambda$. An unambiguous angle measurement may, for example, be obtained using a ULA (uniform linear array) structure in which the antenna elements are spaced apart at $\lambda/2$. In this case, however, the number of antenna elements and thus the number of necessary evaluation channels increases with increasing aperture, so that high hardware costs arise accordingly.

BRIEF SUMMARY OF THE INVENTION

The object of the present invention is to provide a radar sensor which enables an unambiguous angle measurement having unambiguous angular resolution using a predefined number of evaluation channels.

This object is achieved in that the number of antenna elements is greater than the number of evaluation channels and that a switching device is provided to connect the evaluation channels alternatingly to different selections of the antenna elements.

A selection of antenna elements in which each individual element is connected to one of the receive channels is to be referred to in the following as an "array." The switching device may be used, for example, for switching between an array having a great aperture and an array having a smaller aperture. The array having a great aperture provides ambiguous angle information having a high angular resolution. The array having the smaller aperture and correspondingly smaller distances between the adjacent antenna elements may then be used to eliminate the ambiguities. Likewise, it is also possible to switch between three or more different arrays in a regular sequence. The arrays do not necessarily have to have different apertures in this case. For example, it is also possible to select different arrays having identical apertures in which the distances between the individual antenna elements are selected in such a way that the phase relations obtained for the different arrays are only consistent for one single angle of incidence, thus eliminating the ambiguity.

The subclaims describe advantageous embodiments of the present invention.

DETAILED DESCRIPTION OF THE INVENTION

Figure 1:
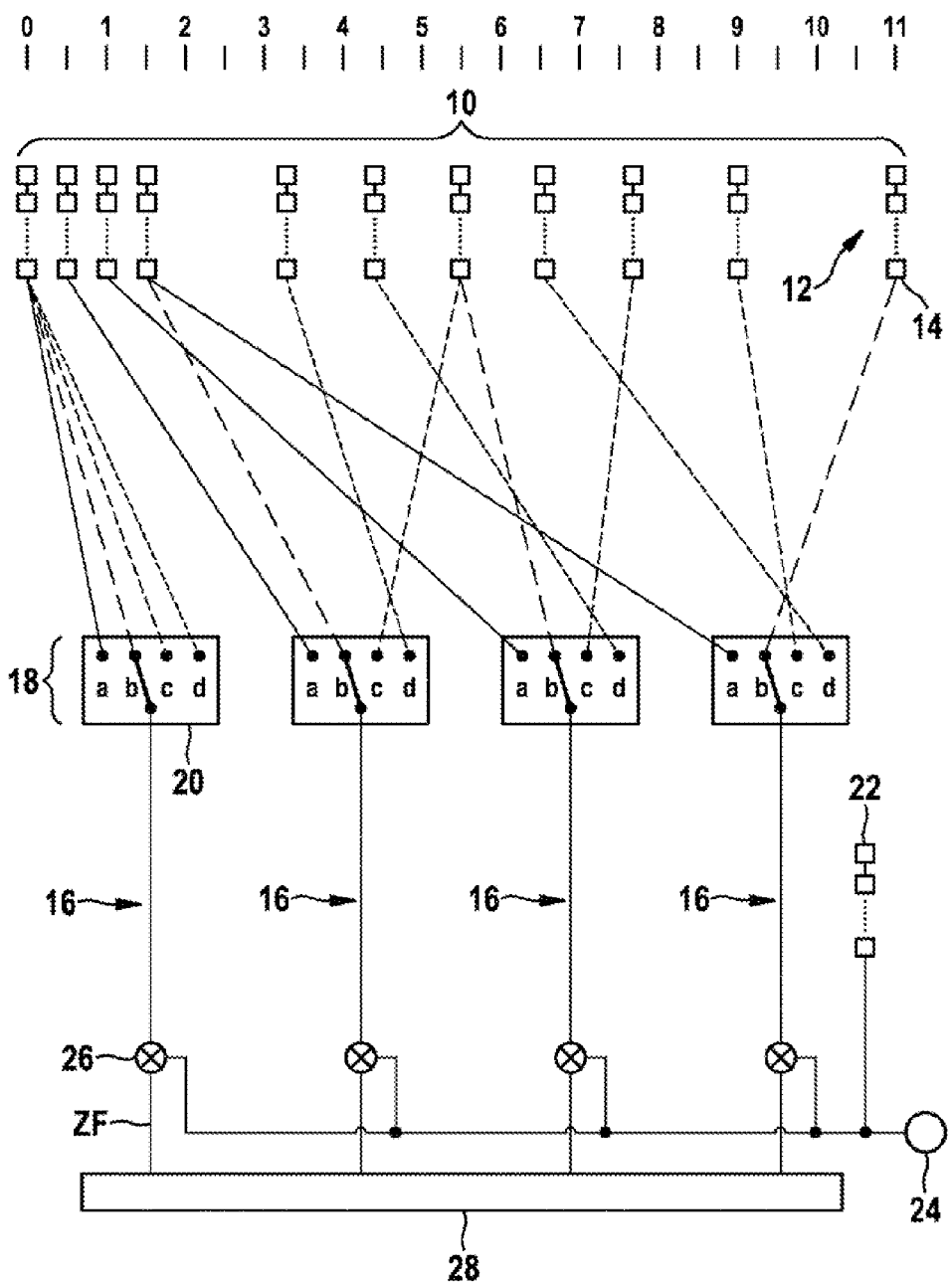
FIG. 1 shows a block diagram of a radar sensor according to the present invention.

The radar sensor shown in FIG. 1 has a planar group antenna 10 which is formed in the illustrated example by eleven antenna elements 12 which are situated horizontally next to one another. Each antenna element 12 includes multiple patches 14 which are situated in a vertical gap, fed in series, and together cause a beam formation in the vertical direction (elevation).

While in a conventional radar sensor a separate evaluation channel is assigned to each individual antenna element, the radar sensor described here only has a total of four evaluation channels 16 for evaluating the signals of a total of eleven antenna elements 12. A switching device 18 is formed by four electronic switches 20, each of which is associated with one of the evaluation channels 16 and has four different switching positions. Evaluation channel 16 is connected to one of antenna elements 12 in each switching position. In this way, a different selection of four antenna elements, whose signals are evaluated in the four evaluation channels 16, is obtained for each combination of the switching positions of the four switches 20. These different selections of antenna elements will be referred to in the following as "arrays."

The radar sensor, described here as an example, is an FMCW (frequency-modulated continuous wave) radar sensor having a bistatic antenna system. Accordingly, in addition to group antenna 10 used as a receive antenna, a transmitting antenna 22 is provided which transmits a radar signal generated by a local oscillator 24. The radar echo reflected from an object is then received by each antenna element 12 of group antenna 10. Each evaluation channel 16 contains a mixer 26 which mixes the signal received by connected antenna element 12 with a portion of the signal generated by local oscillator 24 down to an intermediate frequency signal ZF which is then evaluated further in an evaluation device 28.

The frequency of the signal generated by local oscillator 24 is modulated in a ramp-shaped manner alternating between rising and falling ramps. The frequency of intermediate frequency signal ZF corresponds to the difference between the signal transmitted by transmitting antenna 22 and the signal received by antenna element 14 and is therefore a function of the signal propagation time from transmitting antenna 22 to the object and from the object back to antenna element 14. This propagation time is proportional to the distance from the object. If the object moves in relation to the radar sensor, the frequency of intermediate frequency signal ZF contains in addition also a Doppler component which is a function of the relative velocity of the object. By evaluating the signals obtained on multiple consecutive ramps, it is then possible in a manner known per se to assign an unambiguous distance and an unambiguous relative velocity to every located object.

The radar signals which are reflected from the same point of an object and are then received by different antenna elements 12 travel at different running times (at least in the case of a 0° different azimuth of the object) and therefore differ in their phases. The signal lines from antenna elements 12 to mixers 26 are coordinated in their lengths in such a way that the phase differences of the signals are maintained. Since all signals are mixed with the same oscillator signal, the corresponding phase differences are also obtained in intermediate frequency signals ZF. Based on these phase differences, the angle of incidence of the received radar radiation and thus the azimuth of the associated object may be determined in evaluation device 28.

FIG. 1 shows above group antenna 10 a longitudinal scale which indicates the positions of individual antenna elements 14 in units of wavelength λ of the radar radiation. The position of leftmost antenna element 12 is defined as position 0. Rightmost antenna element 12 is then in position 11. The overall extension of group antenna 10 is thus 11λ, i.e., its maximum aperture has the value 11.

The four leftmost antenna elements 12 are in positions 0.0, 0.5, 1.0, and 1.5 and thus together form a ULA structure having four elements. When all switches 20 of switching device 18 are in switching position "a," the four elements of this ULA structure are switched to the four evaluation channels 16. In this switching position, an unambiguous angle measurement is possible, but only having a low angular resolution due to the small aperture of this array.

When all four switches 20 are in switching position "b," antenna elements 12, which have positions 0.0, 1.5, 5.5, and 11.0, [are] switched to the four evaluation channels 16, as indicated in FIG. 1 by dashed lines with short interruptions. The use of this array allows a measurement having maximum angular resolution, but at the expense of unambiguity.

If all four switches 20 are in switching position "c," antenna elements 12 of the selected array have positions 0.0, 5.5, 7.7, and 9.0 (dashed lines having somewhat shorter dash lengths). In switching position "d," antenna elements 12 of the selected array have positions 0.0, 3.3, 4.4, and 6.6 (finely dashed lines).

For each of these four selectable arrays, an antenna diagram may be prepared which indicates the amplitude and/or the phase relations of the signals received in the four evaluation channels 16 as a function of assumed angle of incidence θ of the radar echo. In general, the azimuth of the located object corresponds, as actual angle of incidence α, to assumed angle of incidence θ for which the best match between the actual amplitude and/or phase relations measured in evaluation channels 16 and the corresponding values result in the antenna diagram. For the evaluation, a DML (deterministic maximum likelihood) function may be computed which indicates the correlation between the actually measured values and the values in the antenna diagram as a function of angle of incidence θ. The function value of the DML function varies between 0 (small correlation) and 1 (perfect match). The amplitudes and/or phases (complex amplitudes) measured in the four evaluation channels 16 may be understood as a vector having four components. Accordingly, the values in the antenna diagram also form a vector having four components for each angle of incidence θ. The DML function may then be computed by normalizing each of these two vectors to 1 and then forming a scale product.

Figure 2:
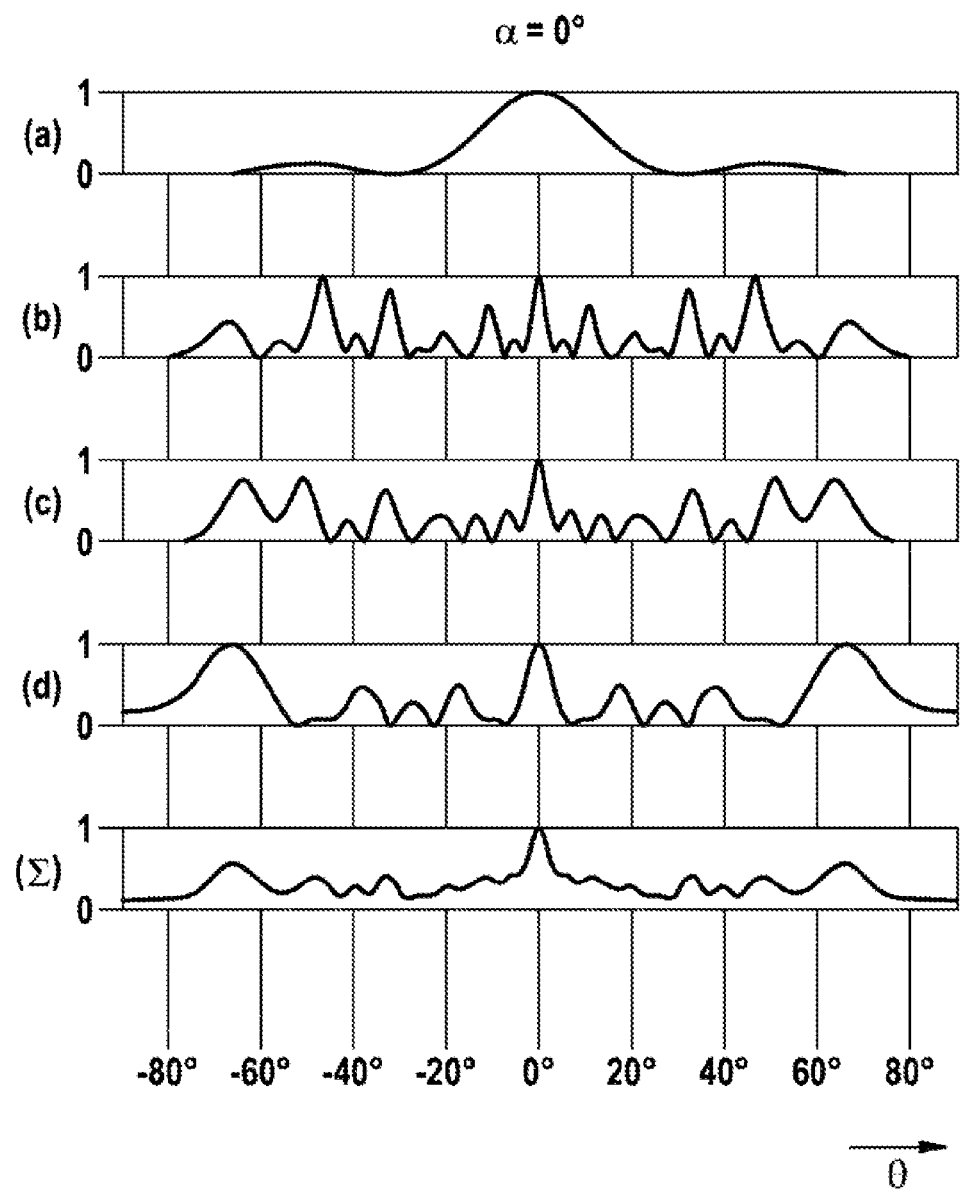
FIG. 2 shows diagrams to illustrate the mode of operation of the radar sensor according to FIG. 1.

FIG. 2 shows examples of such DML functions for the four arrays which correspond to switching positions "a" through "d" in FIG. 1, in each case assuming that the incident radar radiation is frontal (actual angle of incidence α=0°) and the received signals do not contain noise. In the case of unambiguity, the actual azimuth of the located object should then be at angle θ for which the DML function reaches value 1 (i.e., in this example at 0°). For other values of actual angle of incidence α, other (asymmetric) DML functions would be obtained in which the maxima are located at other points. Each function would then have at least one maximum at point θ=α.

Upper diagram (a) in FIG. 2 shows the DML function for the array (ULA) which corresponds to switching position "a" in FIG. 1. As expected, this function has an unambiguous maximum at θ=0. Diagrams (b) through (d) in FIG. 2 show the corresponding DML functions for switching positions "b" through "d" in FIG. 1. It is apparent that considerably stronger maxima occur here, thus corresponding to a greater angular resolution; however, multiple maxima are present in each case which reach at least approximately value 1. Since the signals will contain more or less noise in practice, unambiguous determination of the angle of incidence is not possible using these arrays.

Unambiguous angle determination having a high resolution is however possible, when the signals obtained by all four arrays are combined, is e.g., by forming the sum of the four DML functions. This sum is illustrated in FIG. 2 in diagram (Σ). It is apparent that in this sum, only one strongly pronounced maximum is present at θ=0, while the remaining maxima are suppressed to the extent that they do not reach value 1 even if the noise is taken into account.

Switching device 18 (FIG. 1) may now be controlled in such a way, for example, that after every frequency ramp of local oscillator 24, it is switched over to another switching position, so that a measurement has been carried out after four ramps by each of the four possible arrays. The results contained in evaluation channels 16 are then stored (for each individual object) so that after four ramps the azimuth of each object may be determined with high resolution and without ambiguities based on the sum of the DML functions.

Instead of the sum of the DML functions, it is optionally also possible to use a weighted sum, the weighting for every array, for example, being a function of the aperture of the array and/or of the particular inclination of the frequency ramp on which the measurement takes place using this array.

The leftmost switch 20 is plotted in FIG. 1 only systematically. In practice, this switch has no functions, since the signal of the leftmost antenna element 14 is evaluated in this channel. This switch may therefore be replaced in practice by a fixed connection.

The configuration of antenna elements 14 shown here is only to be understood as an example. Other positions may also be selected for the antenna elements. Likewise, the number of the antenna arrays and/or the number of the evaluation channels could be varied. The positions of antenna elements 14 in the different arrays may be optimized, for example, with the aid of a computer simulation. Particularly advantageous is a configuration of the antenna elements and a selection of arrays in which all arrays have a relatively large aperture and the DML functions fulfill the condition that for each actual angle of incidence α there is only one single value θ for which all DML functions have a maximum, which approaches value 1. At this value θ, the sum function has an absolute maximum.

What is claimed is:

1. An angle-resolving radar sensor, comprising:
a receive antenna having multiple receive antenna elements which are each switchable to at least one of multiple evaluation channels, wherein a first evaluation channel to which a first receive antenna element is switchable is different than a second evaluation channel to which a second receive antenna element is switchable, and wherein at least one of the first and second receive antenna elements is switchable to both the first evaluation channel and the second evaluation channel;
a switching device to connect the evaluation channels alternatingly to different selections of receive antenna elements; and
an evaluation device for determining an angle of incidence of a received signal based on amplitudes measured in the evaluation channels;
wherein the number of receive antenna elements is greater than the number of evaluation channels.

2. The radar sensor as recited in claim 1, wherein:
the radar sensor is configured as a frequency-modulated continuous wave (FMCW) radar sensor;
the frequency of a transmitted radar signal is modulated in a ramp-shaped manner; and
the switching device is configured to switch over periodically, for one frequency modulation ramp in each case, to another selection of receive antenna elements.

3. The radar sensor as recited in claim 2, wherein the evaluation device is configured to (i) compute for each selection of receive antenna elements a function of the angle of incidence which indicates in an antenna diagram a correlation between signals received in the evaluation channels and respective values of the received signals, (ii) form a sum function from the computed functions of the angle of incidence, and (iii) ascertain the maximum of the sum function.

4. The radar sensor as recited in claim 3, wherein the receive antenna elements and the selections made by the switching device are configured in such a way that the sum function for each combination of the received signals, which corresponds to a real angle of incidence of the radar radiation, has an unambiguous maximum.

* * * * *